A. M. DEMUTH.
HAM SHAPER AND BINDER.
APPLICATION FILED MAR. 9, 1918.
1,358,063.
Patented Nov. 9, 1920.
4 SHEETS—SHEET 1.
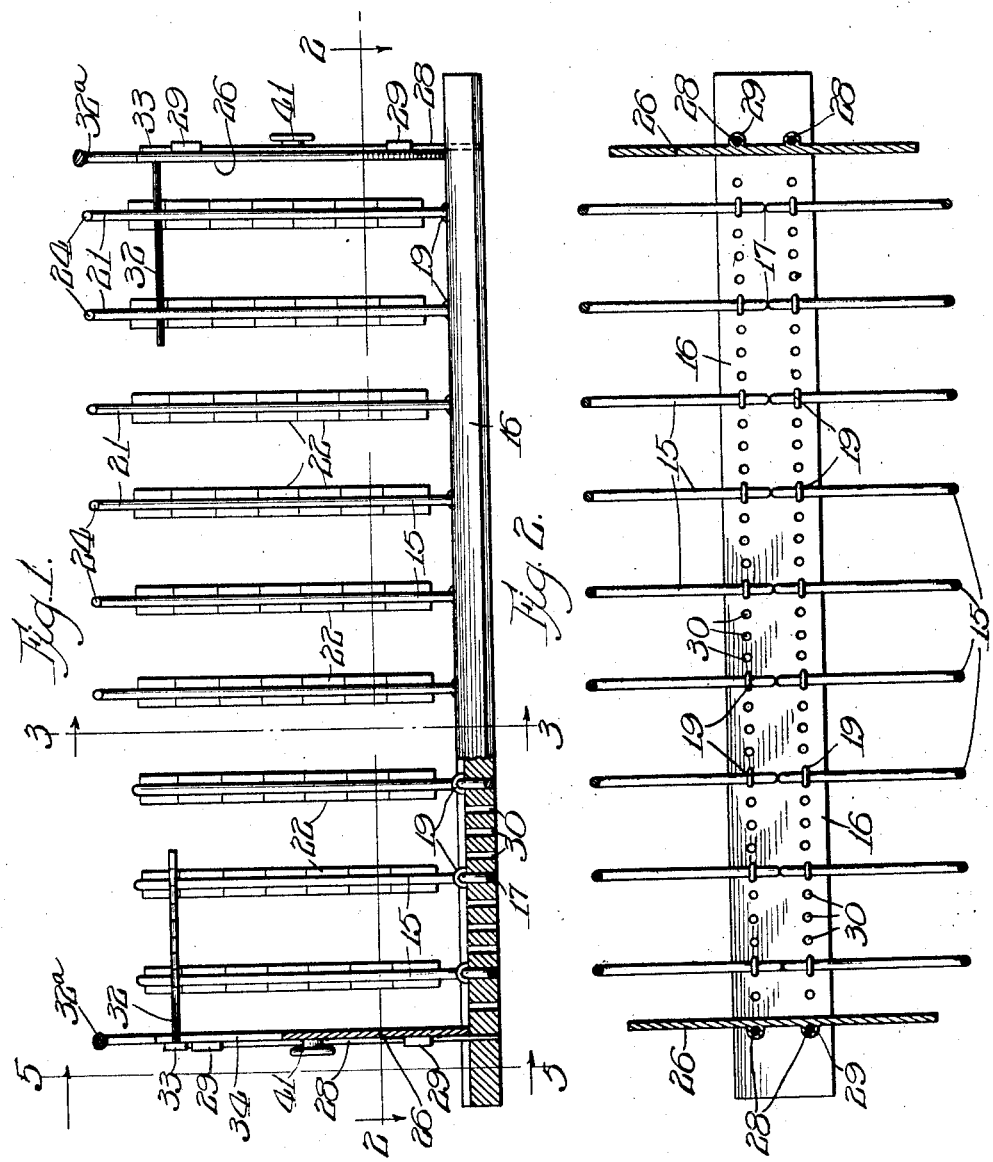

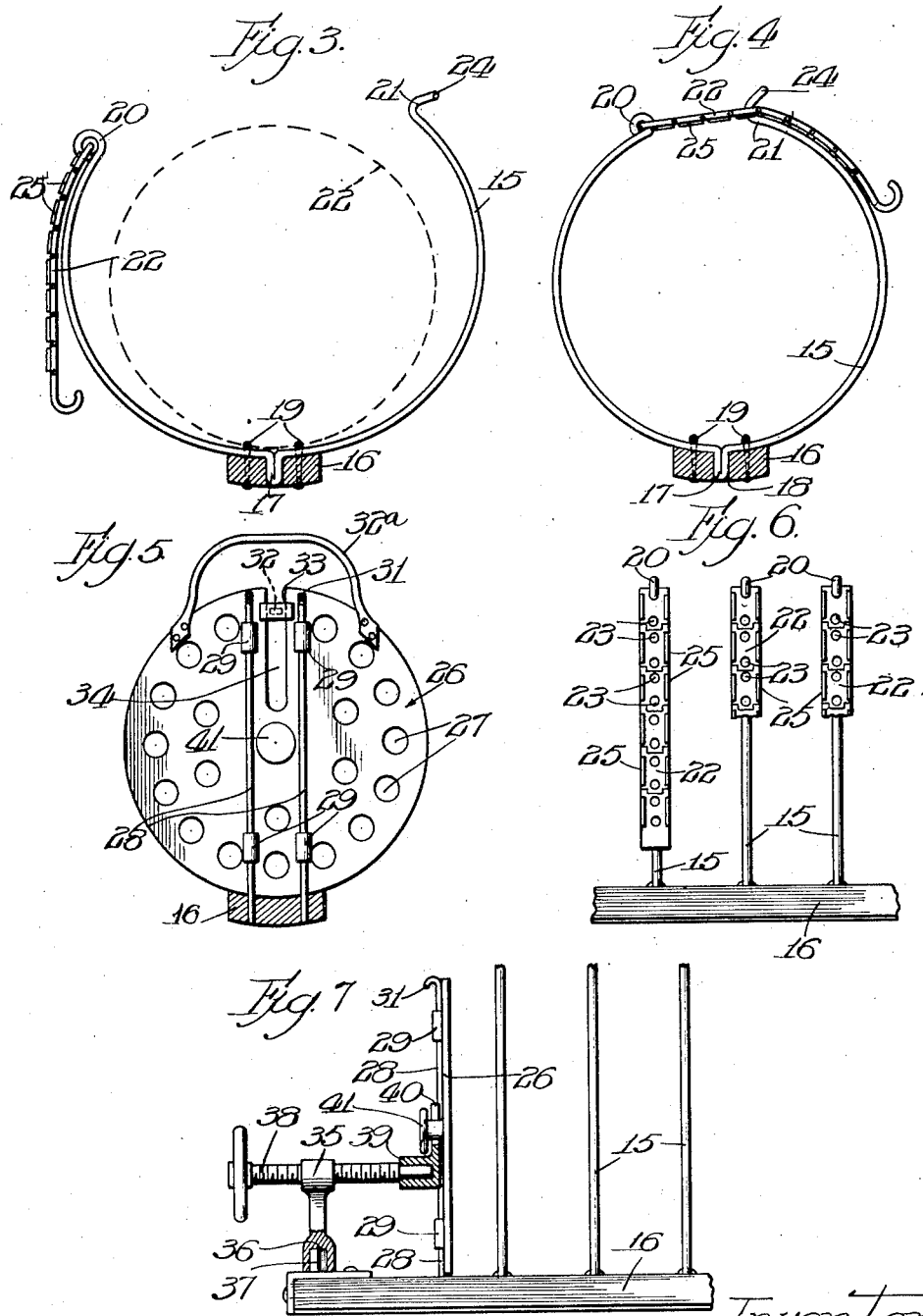

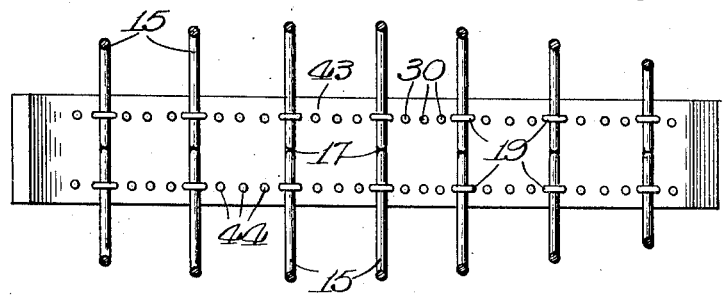
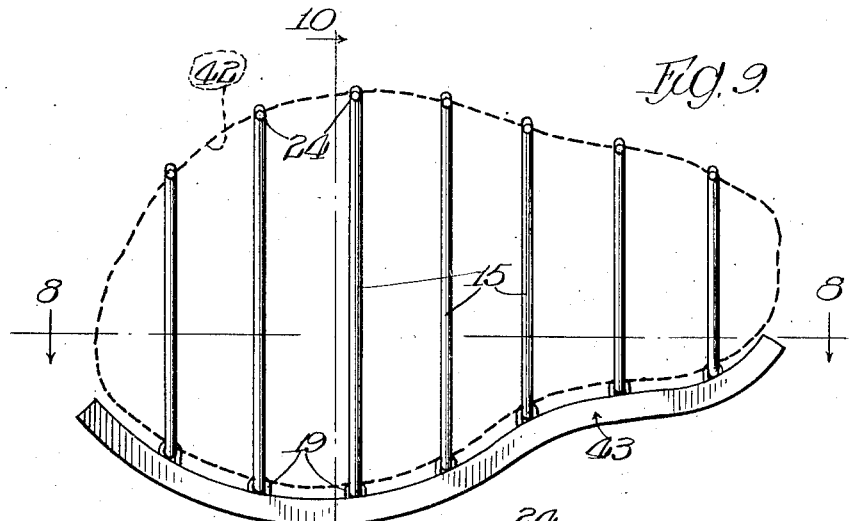
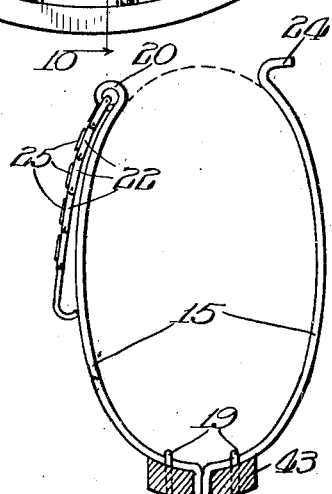

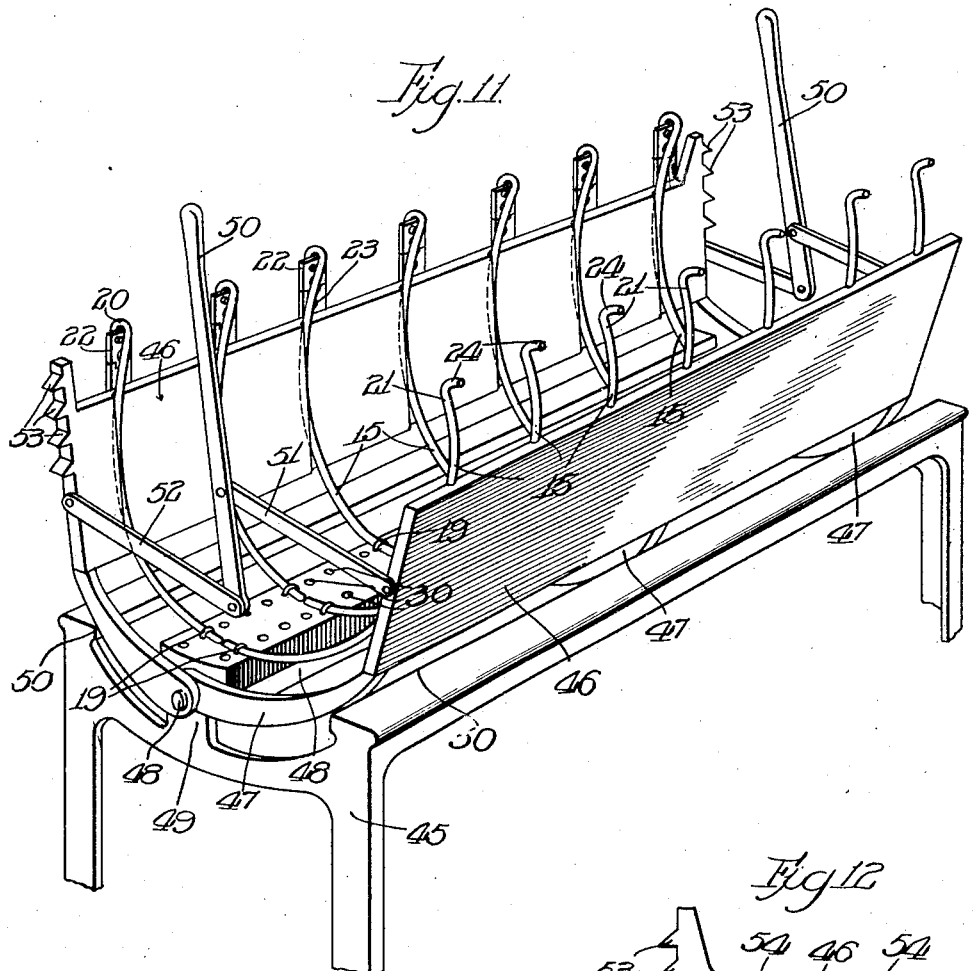
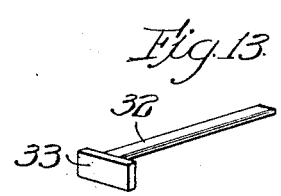
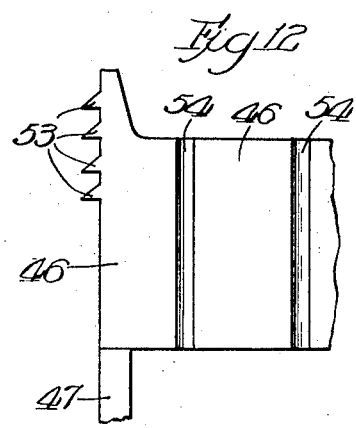

UNITED STATES PATENT OFFICE.

ALFRED M. DEMUTH, OF CHICAGO, ILLINOIS, ASSIGNOR TO JOHN A. KELLY, OF CHICAGO, ILLINOIS.

HAM SHAPER AND BINDER.

1,358,063.  Specification of Letters Patent.  Patented Nov. 9, 1920.

Application filed March 9, 1918. Serial No. 221,376.

*To all whom it may concern:*

Be it known that I, ALFRED M. DEMUTH, a citizen of the United States, residing at Chicago, in the county of Cook and State of Illinois, have invented certain new and useful Improvements in Ham Shapers and Binders, of which the following is a specification.

This invention relates to improvements in shapers and binders particularly adapted though not necessarily limited in its use with boned hams, and one of the objects of the same is to provide an improved device of this character by means of which the meat may be delivered in a compressed form suitable for slicing, the shaper or binder being adapted to be placed with the meat therein into the vessel in which the meat is to be cooked.

A further object is to provide an improved device of this character by means of which indentations or grooves will be formed in the outer surface of the meat during the cooking operation, whereby the binding strings or cords ordinarily used may be dispensed with, and the particles of meat will be firmly held together after it is removed from the shaper or binder.

A further object is to provide an improved device of this character embodying means whereby the device will accommodate itself to the meat irrespective of the expansion or contraction of the meat during the cooking operation and at the same time will hold the meat under compression during all conditions.

A further object is to provide an improved device of this character embodying means for conforming to the irregularities in contour of the meat, and means for shaping the ends of the meat.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which:

Figure 1 is a view partly in side elevation and partly in section of an improved device of this character constructed in accordance with the principles of this invention.

Fig. 2 is a horizontal sectional view as taken on line 2—2, Fig. 1.

Fig. 3 is a detail vertical sectional view as taken on line 3—3, Fig. 1 and with the encircling member open.

Fig. 4 is a view similar to Fig. 3 showing the encircling member in the position it will assume when closed about the meat.

Fig. 5 is a detail vertical sectional view on line 5—5, Fig. 1.

Fig. 6 is a detail vertical elevation as taken from the left hand side of Fig. 3.

Fig. 7 is a detail view partly in elevation and partly in section of a modified form of the end adjusting plate.

Fig. 8 is a horizontal sectional view taken on line 8—8, Fig. 9 of a modified form of the invention.

Fig. 9 is a side elevation of the parts shown in Fig. 8 of a form adapted to receive a ham in its natural shape, and with the flexible members detached so as to permit encircling members to remain open.

Fig. 10 is a vertical sectional view taken on line 10—10, Fig. 9.

Fig. 11 is a perspective view of a press showing the binder therein and which press is adapted to partially compress the encircling members about the meat.

Fig. 12 is a detail front elevation of the face of one of the press members.

Fig. 13 is a detail perspective view of the flexible member which assists in holding the end plate in position.

Referring more particularly to the drawings, the numeral 15 designates a plurality of laterally spaced flexible encircling or binding members which are adapted to be bound upon and about the meat. These members may be constructed of any suitable material and in any desired shape and are laterally spaced from each other and held in such space relation in any suitable manner, such as by means of a support 16 constructed of any suitable material. The members 15 are preferably formed by bending a portion thereof upon itself to form a projection 17, adapted to be inserted in a suitable aperture 18 in the member 16 and suitable fastening devices 19 may also be provided for securing the members 15 to the member 16.

The free ends 20, 21 of the members 15 terminate short of each other to form an opening through which the meat 22 is adapted to be placed in position. Connected with the extremity 20 of each of the members 15 is a flexible element 22, having a series of openings 23 therethrough which are adapted to receive the other extremity 24 of the member 15, when the latter is contracted about the meat as shown in Fig. 4.

The flexible member 22 may be provided with ribs or projections 25 extending from face thereof and which are adapted to embed themselves in the surface of the meat to form grooves in the meat across the opening between the ends of the member 15. Obviously the member 22 being flexible, any desired tension may be placed upon the members 15, and each of the members 15 and its flexible associated member 22 being independent of the others, it will be manifest that the members 15 may be adjusted to compensate the irregularities of the meat.

End members 26 may be provided to be disposed adjacent the ends of the series of members 15 to form abutments for the ends of the meat and assist in shaping the ends. These end members 26 may be constructed of any suitable material and may be of any desired shape and are provided with a series of openings 27 therethrough so as not to interfere with the cooking of the meat. They may be held in position in any desired or suitable manner, preferably by means of suitable pins or members 28 connected with the outer face thereof adapted to slide in suitable bearings 29. The lower extremities of these members 28 are adapted to be projected beyond the periphery of the member 26 so as to enter suitable apertures 30 in the member 16, whereby the end members may be adjusted longitudinally of the member 16 to accommodate pieces of meat of varying lengths. To facilitate the adjustment of the members 28 with respect to the member 26, handles or projections 31 may be formed on the other ends of the members 28.

A handle 32ª may also be provided for facilitating the adjustment of the member 26.

In use, this member 26 is placed adjacent one of the encircling members 15 so that the end of the meat will abut thereagainst and in order to prevent the deflecting of the upper portion of the member, any suitable fastening means may be provided but preferably a flexible element 32, having a head 33, is adjustably connected with the member 26 by means of a slot 34 through which a portion of the member 32 projects so that the head 33 thereof will stand adjacent the outer face of the member 26 and the slot 34 being vertical it will be manifest that the member 32 may be radially adjusted with respect to the member 26 according to the diameter of the meat in the binder. The member 32 is adapted to rest upon the outer surface of the meat and is of such a length that it will extend transversely of the member 15 to such an extent that it will project under the respective flexible members 22, when the latter are in the position shown in Fig. 4, and these members 22 will serve to bind the member 32 and hold it in position.

If desired, an adjusting device, shown in Fig. 7, may be provided for adjusting the end member 26. A simple and efficient device of this character embodies a support 35 which is detachably connected with the member 16 in any desired or suitable manner preferably by means of a socket 36 adapted to receive a lug or projection 37 secured to the member 16, whereby the support may be removed when desired. A screw 38 has a bearing in the member 35 and is provided with a head 39 with which the screw 38 is rotatably connected and its head is provided with jaws 40, adapted to receive a headed projection 42 carried by the member 26. Thus it will be seen that to adjust the member 26 so as to place a compression upon the end of the meat, the members 28 are first withdrawn from the openings 30 and the screw 38 then rotated which will force the member 26 against the end of the meat and when the desired adjustment has been obtained, the members 28 may then be inserted in the adjacent openings 30.

In the form of the invention shown in Figs. 8 to 10, the binder and shaper is of a construction to receive a ham 42 indicated in dotted lines in Fig. 9 and the shaper is of a configuration so that the ham may be placed therein on its edge as shown in Fig. 10 and the encircling members 15 are of a shape to be bound upon and about the ham. It will be noted that some of the encircling members 15 are of a greater diameter than the others, and this is provided in order that the encircling members may conform to the contour and irregularities of the ham to be bound therein. The supporting base 43 in this form of the invention is of a shape conforming somewhat to a compound curve so as to also conform to the contour of the edge of the ham. Obviously end members similar to the member 26 may also be employed with this form of the invention, if desired, and the supporting member 43 may be provided with openings 44 for that purpose.

In order to assist in binding the members 15 about the meat when the meat is placed within the binder, a suitable press may be provided, such as that shown in Fig. 11 and comprising a suitable support 45 upon which are pivotally mounted jaw members 46, having arms 47 which are pivotally connected as at 48 and the press is connected with the support 45 in any suitable manner, preferably by means of the pivot bolt 48 passing through suitable bearings 49 on the support 45, and the latter is shaped to form stops 50 for limiting the opening movement of the jaws. The binder and shaper is placed within this press either before or after the meat has been placed within the binder and when in position in the press, the jaw members 46 are moved toward each other in any suitable manner, such as by means of an operating lever or handle 50 connected by means of links 51, 52 with the jaw members 46 so that by operating the handle 50, the links will draw the members 46 toward each other and compress the encircling members 15. Ratchet teeth 53 may be provided and adapted to be engaged by the handles 50 for maintaining the members 15 compressed. If desired, the face of the jaw members 36 may be provided with a series of grooves 54 into which the flexible members 15 project.

When the members 15 are thus compressed it will be manifest that the flexible members 22 may be connected with the free ends of the respective members 15 and if it is desired to place any one or more of the members 15 under a greater tension than is applied thereto by the press, this can be readily accomplished by adjusting the members individually and while they are still in the press. After the binder has been thus fastened upon the meat, the press may be opened and the binder with the meat therein removed from the press and placed in the vessel in which the meat is to be cooked.

It will be obvious that inasmuch as the members 22 are flexible, they will not occupy much space in the cooker.

While the preferred forms of the invention have been herein shown and described, it is obvious that various changes may be made in the details of construction, and in the combination and arrangement of the several parts without departing from the spirit of this invention.

What is claimed as new is:—

1. A device of the character described embodying a plurality of laterally spaced open flexible and independently operable encircling members adapted to be bound upon and about the meat, and flexible securing members individual to the ends of the respective members whereby the members may be adjusted independently with relation to each other and with respect to the meat, one end of each of the securing members being permanently connected with one of the flexible encircling members and adapted to detachably engage the end of the coöperating encircling member.

2. A device of the character described embodying a plurality of laterally spaced open flexible encircling members adapted to be bound upon and about the meat, flexible means individual to the ends of the respective members and adapted to extend across the space therebetween for securing the ends together, and means connected with the said flexible means to project from the face thereof and adapted to be embedded in the meat.

3. A device of the character described embodying a plurality of laterally spaced open flexible and independently operable encircling members adapted to be bound upon and about the meat and maintained in such position during the cooking of the meat, means individual to the encircling members for separately securing the ends of the respective members together, and end abutting members for the meat, said end members extending across the space formed by the encircling members.

4. A device of the character described embodying a plurality of laterally spaced open flexible and independently operable encircling members adapted to be bound upon and about the meat, separate flexible members individual to the encircling member and secured by one end to one end of each of the encircling members, said flexible members being adapted to detachably engage the other end of the respective encircling members for securing the ends of the said members together, and end abutting members for the meat, said end members extending across the space formed by the encircling members, one of the said end members being adjustable toward the other end member.

5. A device of the character described embodying a plurality of laterally spaced open flexible encircling members adapted to be bound upon and about the meat, an end member forming an abutment for the meat, means for connecting the ends of the encircling members, and means connected with the said end member and adapted to be clamped against the meat for holding the end member in position.

6. A meat holder embodying an open flexible encircling member adapted to be bound about and upon the meat, means for connecting the ends of said member, an end abutment member, and a flexible element connected with the abutment member and adapted to be clamped between the meat and a portion of the binder for resisting lateral strain on the end member.

7. A meat binder embodying an open flexible encircling member adapted to be bound about and upon the meat, means for connecting the ends of said member, an end abutment member, and a flexible element connected with the abutment member and adapted to be clamped between the meat and a portion of the binder for resisting lateral strain on the end member, the end of the said flexible element being connected with the end member for radial adjustment with respect thereto.

8. A meat binder embodying an open flexible member adapted to be bound about and upon the meat, means for connecting the ends of said member, an end abutment member, a flexible element connected with the abutment member and adapted to be clamped between the meat and a portion of the binder for resisting lateral strain on the end member, and additional means for holding the end member against lateral adjustment.

9. A device of the character described embodying a support, a plurality of laterally spaced open flexible encircling members, there being a projection on the flexible members, said support having openings individual to the projections for receiving them, means for securing the support and member together, and means connecting the free ends of the said members.

10. A device of the character described embodying a support, a plurality of laterally spaced open flexible members engaging therewith, interengaging means between the members and support for holding the members against lateral movement with respect to the support, means for securing the support and members together, and means for connecting the open ends of the flexible members.

11. A device of the character described embodying a support, an open flexible encircling member, a portion of the member being shaped to form a radially projecting extension, there being an opening in the support for receiving the said extension, and means for connecting the said ends of the encircling member.

12. A device of the character described embodying a frame, having a shape to conform to the general contour of a ham, said frame embodying laterally spaced open flexible and independently operable encircling members adapted to be bound upon and about the ham and maintained in such position during the cooking of the ham, and flexible members individual to the encircling members for connecting the ends of the said members for individual adjustment, one end of each of the second recited flexible members being permanently secured to one end of the respective encircling members and adapted to detachably engage the other end of the encircling members.

13. A device of the character described embodying a frame, having a shape to conform to the general contour of a ham, said frame embodying laterally spaced open flexible encircling members adapted to be bound upon and about the ham, means for connecting the ends of the said members for individual adjustment, and end members for the frame, said end members serving as abutments for the ends of the ham.

14. A device of the character described embodying a frame, having a shape to conform to the general contour of a ham, said frame embodying laterally spaced open flexible encircling members adapted to be bound upon and about the ham, means for connecting the ends of the said members for individual adjustment, end members for the frame, said end members serving as abutments for the ends of the ham, and means whereby the end members may be relatively adjusted one with relation to the other.

In testimony whereof I have signed my name to this specification, on this 6th day of March, A. D. 1918.

ALFRED M. DEMUTH.